(12) United States Patent
Kim et al.

(10) Patent No.: US 11,460,966 B2
(45) Date of Patent: Oct. 4, 2022

(54) DISPLAY DEVICE

(71) Applicant: Samsung Display Co., Ltd., Yongin-si (KR)

(72) Inventors: Miyoung Kim, Hwaseong-si (KR); Kwanghyeok Kim, Cheonan-si (KR); Soyeon Park, Yongin-si (KR); Yong-Hwan Park, Hwaseong-si (KR); Sanghyun Jun, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/158,770

(22) Filed: Jan. 26, 2021

(65) Prior Publication Data
US 2021/0255738 A1 Aug. 19, 2021

(30) Foreign Application Priority Data
Feb. 19, 2020 (KR) .................. 10-2020-0020092

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 2203/04107* (2013.01); *G06F 2203/04111* (2013.01)

(58) Field of Classification Search
CPC ................. G06F 3/0446; G06F 3/0412; G06F 2203/04107; G06F 2203/04111
See application file for complete search history.

(56) References Cited

U.S. PATENT DOCUMENTS

| | | |
|---|---|---|
| 9,869,878 B2 | 1/2018 | Namkung |
| 2012/0306776 A1* | 12/2012 | Kim ............... G06F 3/0446 345/173 |
| 2015/0160756 A1* | 6/2015 | Polishchuk ....... G06F 3/041662 345/174 |
| 2018/0373359 A1 | 12/2018 | Han et al. |

FOREIGN PATENT DOCUMENTS

| | | |
|---|---|---|
| KR | 10-1607147 B1 | 3/2016 |
| KR | 10-2016-0119934 A | 10/2016 |
| KR | 10-2019-0000026 A | 1/2019 |
| KR | 10-2019-0084012 A | 7/2019 |

* cited by examiner

*Primary Examiner* — Peter D McLoone
(74) *Attorney, Agent, or Firm* — Lewis Roca Rothgerber Christie LLP

(57) ABSTRACT

A display device including a display panel, and an input sensor on the display panel, and in which an active area and a peripheral area and includes a first area and a second area spaced apart in a first direction, are defined, the input sensor including first sensing electrodes extending in the first direction, and arranged in a second direction crossing the first, second sensing electrodes extending in the second direction, and arranged in the first direction, first sensing lines extending in the second direction within the active area, connected to the first sensing electrodes, and partially located in the first area, respectively, second sensing lines electrically connected to the second sensing electrodes, respectively, and at least partially located in the second area, and a first guard electrode between the first sensing lines and the second sensing lines, and at a boundary between the first area and the second area.

20 Claims, 9 Drawing Sheets

DISPLAY DEVICE

CROSS-REFERENCE TO RELATED APPLICATIONS

This application claims priority to, and the benefit of, Korean Patent Application No. 10-2020-0020092, filed on Feb. 19, 2020, the entire contents of which are hereby incorporated by reference.

BACKGROUND

Electronic apparatuses, such as smart phones, digital cameras, laptop computers, navigations, and televisions, which provide an image to a user, include a display device for displaying the image. The display device may include a display panel for generating and displaying an image, and an input device such as a keyboard, a mouth, or a touch panel.

The touch panel may be located above the display panel, and an input signal is generated when a user touches the touch panel. The input signal generated from the touch panel is provided to the display panel. In response to the input signal provided from the touch panel, the display panel may provide the user with the image corresponding to the input signal.

SUMMARY

Embodiments of the present disclosure provide a display device in which a surface area of a bezel area is reduced.

Some embodiments of the present disclosure provide a display device including a display panel, and an input sensor on the display panel, and in which an active area and a peripheral area, which is adjacent to the active area and includes a first area and a second area spaced apart in a first direction, are defined, the input sensor including first sensing electrodes extending in the first direction, and arranged in a second direction crossing the first direction, second sensing electrodes extending in the second direction, and arranged in the first direction, first sensing lines extending in the second direction within the active area, connected to the first sensing electrodes, and partially located in the first area, respectively, second sensing lines electrically connected to the second sensing electrodes, respectively, and at least partially located in the second area, and a first guard electrode between the first sensing lines and the second sensing lines, and at a boundary between the first area and the second area.

The first sensing lines may be spaced apart in the first direction within the active area.

The first sensing electrodes may include first sensing patterns arranged in the first direction and first connection patterns connecting neighboring ones of the first sensing patterns, wherein the second sensing electrodes include second sensing patterns arranged in the second direction and second connection patterns connecting neighboring ones of the second sensing patterns, and wherein the first connection patterns and the second connection patterns respectively cross each other while being insulated from each other.

The first sensing lines in the active area may be on a same layer as the second connection patterns.

When viewed in a plan view, the first sensing lines and the second sensing electrodes may be alternately arranged.

The first guard electrode may be configured to apply a ground voltage.

The peripheral area may further include a third area between the first area and the active area, and between the second area and the active area, wherein the first sensing lines and the second sensing lines cross each other in the third area.

The display device may further include a second guard electrode in the third area, and crossing the first sensing lines and the second sensing lines.

The display device may further include a second guard electrode at a boundary between the second area and the third area, and spaced apart from the first sensing lines and the second sensing lines.

The display device may further include a guard pad overlapping the peripheral area, and electrically connected to the first guard electrode, and sensing pads overlapping the peripheral area, and electrically connected to the first sensing lines and the second sensing lines, respectively.

The sensing pads may include first sensing pads electrically connected to the first sensing lines, respectively, and second sensing pads electrically connected to the second sensing lines, respectively, wherein the first sensing pads and the second sensing pads are spaced apart from each other with the guard pad therebetween.

In some embodiments of the present disclosure, a display device includes a display panel and an input sensor on the display panel, wherein the input sensor includes a base insulating layer including an active area, a first area spaced apart from the active area in a second direction, and a second area spaced apart from the active area in the second direction and spaced apart from the first area in a first direction crossing the second direction, first sensing electrodes located in the active area, second sensing electrodes located in the active area, first sensing lines partially located in the first area, and alternately arranged with the second sensing electrodes in the active area, second sensing lines located in the second area and connected to the second sensing electrodes, respectively, and a first guard electrode located between the first area and the second area.

The first sensing lines may extend in the second direction and may be spaced part from each other in the first direction.

The base insulating layer may further include a third area between the active area and the first area and between the active area and the second area, wherein the first sensing lines and the second sensing lines cross each other in the third area while being insulated from each other.

The first guard electrode may extend in the second direction, wherein the display device further includes a second guard electrode electrically connected to the first guard electrode, and extending in the first direction.

The second guard electrode may be in the third area and crosses the first sensing lines and the second sensing lines while being insulated from the first sensing lines and the second sensing lines.

The second guard electrode may be at a boundary between the second area and the third area, and is spaced apart from the first sensing lines and the second sensing lines.

The display device may further include a guard pad electrically connected to the first guard electrode, and sensing pads electrically connected to the first sensing lines and the second sensing lines, respectively.

The guard pad may be configured to supply a ground voltage to the first guard electrode.

The sensing pads may include first sensing pads electrically connected to the first sensing lines, respectively, and second sensing pads electrically connected to the second sensing lines, respectively, wherein the first sensing pads and the second sensing pads are spaced apart from each other with the guard pad therebetween.

BRIEF DESCRIPTION OF THE FIGURES

The accompanying drawings are included to provide a further understanding of the present disclosure, and are incorporated in and constitute a part of this specification. The drawings illustrate embodiments of the present disclosure and, together with the description, serve to explain aspects of the present disclosure. In the drawings.

DETAILED DESCRIPTION

Figure 1:
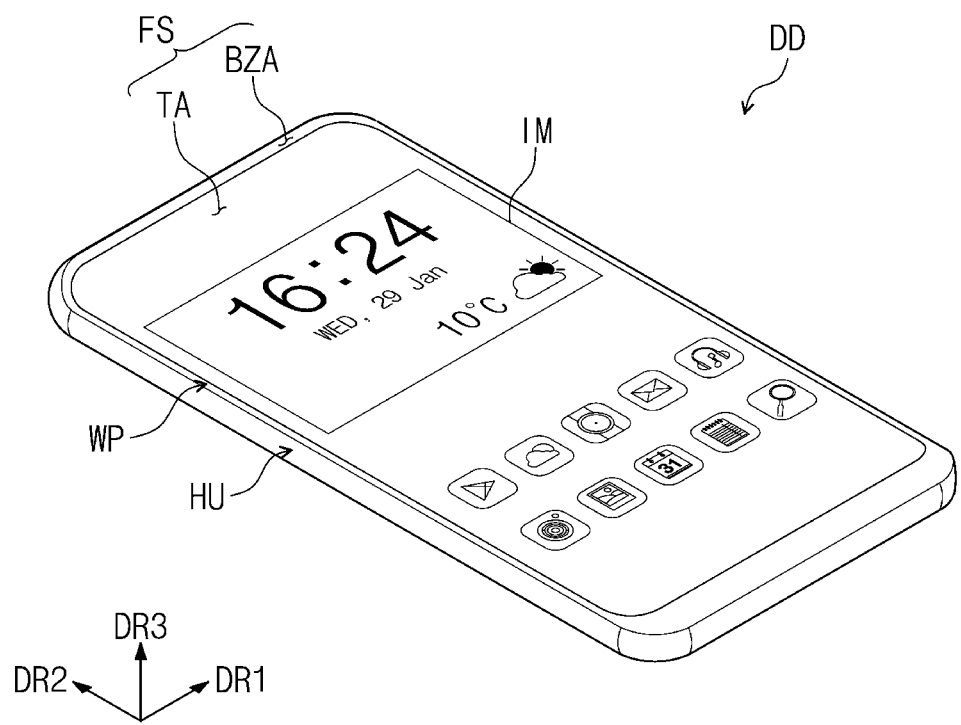
FIG. 1 is a perspective view of a display device according to some embodiments of the present disclosure.

Features of the inventive concept and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects and features of the present inventive concept to those skilled in the art. Accordingly, processes, elements, and techniques that are not necessary to those having ordinary skill in the art for a complete understanding of the aspects and features of the present inventive concept may not be described.

Unless otherwise noted, like reference numerals, characters, or combinations thereof denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, in this specification, the phrase "on a plane," or "plan view," means viewing a target portion from the top, and the phrase "on a cross-section" means viewing a cross-section formed by vertically cutting a target portion from the side.

It will be understood that when an element, layer, region, or component is referred to as being "formed on," "on," "connected to," or "coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
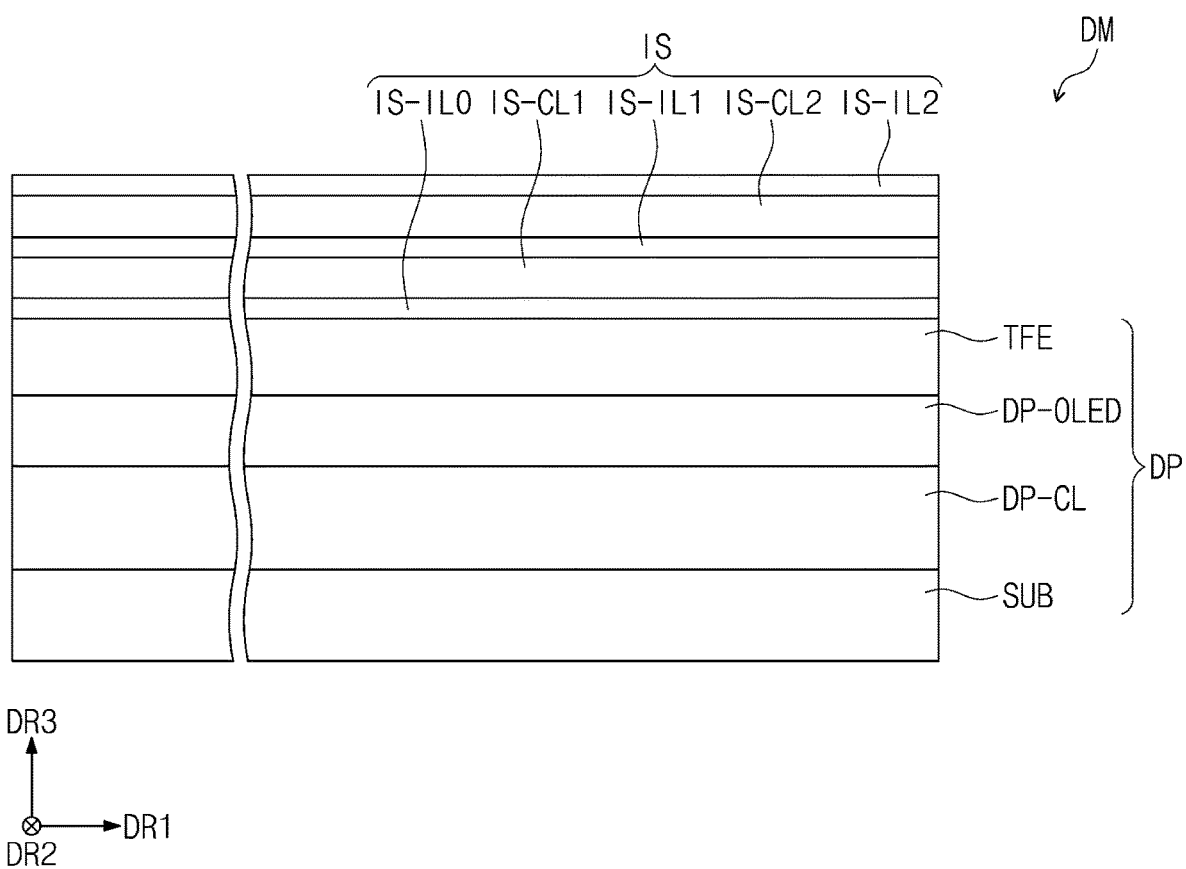
FIG. 2 is a cross-sectional view of a display module according to some embodiments of the present disclosure.

FIG. 1 is a perspective view of a display device according to some embodiments of the present disclosure, and FIG. 2 is a cross-sectional view of a display module according to some embodiments of the present disclosure.

Referring to FIGS. 1 and 2, a display device DD may be a device that is activated according to an electrical signal. The display device DD may include various embodiments. For example, the display device DD may be used in large scale electronic apparatuses, such as a television, a monitor, and an outdoor advertising board, and also may be used in small-to-medium scale electronic apparatuses, such as a personal computer, a laptop computer, a personal digital terminal, a vehicle navigation unit, a game console, a mobile electronic apparatus, and a camera. Also, these are merely provided as embodiments, and thus the display device DD may be employed in other electronic apparatuses as long as not departing from the present disclosure. In some embodiments, the display device DD is illustratively shown as a smart phone.

The display device DD may display an image IM, in a third direction DR3, on a display surface FS that is parallel to each of a first direction DR1 and a second direction DR2. The image IM may include static images as well as dynamic images. In FIG. 1, a watch window and icons are illustrated as examples of the image IM. The display surface FS on which the image IM is displayed may correspond to a front surface of the display device DD, and also may correspond to a front surface of a window WP.

In some embodiments, a front surface (or a top surface) and a rear surface (or a bottom surface) for each member may be defined with respect to the direction in which the image IM is displayed. The front and rear surfaces may face each other, or may be opposite each other, with respect to the third direction DR3, and normal directions of both the front and rear surfaces may be substantially parallel to the third direction DR3. Also, the plane defined by both the first direction DR1 and the second direction DR2 in this specification is defined as a plan view, and "when viewed in a plan view" may be defined as when viewed in the third direction DR3.

The third direction DR3 may be a direction crossing both the first direction DR1 and the second direction DR2. The first direction DR1, the second direction DR2, and the third direction DR3 may be substantially perpendicular to each other.

The display device DD may include a window WP, a display module DM, and a housing HU. In some embodiments, the window WP and the housing HU may be coupled to each other to define an exterior of the display device DD.

The window WP may include an optically transparent insulating material. For example, the window WP may include glass or plastic. The window WP may have a multi-layered or single-layered structure. For example, the window WP may include a plurality of plastic films that are bonded by an adhesive, or a glass substrate and a plastic film that are bonded to each other by an adhesive.

As described above, the display surface FS of the window WP may define the front surface of the display device DD. The display surface FS may include a transmission area TA and a bezel area BZA. The transmission area TA may be an optically transparent area. For example, the transmission area TA may be an area having a visible light transmittance of about 90% or higher.

The bezel area BZA may be an area having a relatively lower light transmittance than the transmission area TA. The bezel area BZA may define a shape of the transmission area TA. The bezel area BZA may be adjacent to the transmission area TA, and may surround the transmission area TA.

The bezel area BZA may have a color (e.g., a predetermined color). The bezel area BZA covers a peripheral area of the display module DM, and thus visibility of the peripheral area from the outside may be reduced or prevented. However, this is merely illustrated as an example. The bezel area BZA may be omitted in the window WP according to some embodiments of the present disclosure.

The display module DM may display the image IM, and may sense an external input. The display module DM may include a display panel DP and an input sensor IS.

The display panel DP may be a light emitting-type display panel, but is not particularly limited thereto. For example, the display panel DP may be an organic light emitting display panel or a quantum-dot light emitting display panel. A light emitting layer of the organic light emitting display panel may include an organic light emitting material. A light emitting layer of the quantum-dot light emitting display panel may include quantum dots, quantum rods, or the like.

The display panel DP may include a base layer SUB, a circuit layer DP-CL, a light emitting element layer DP-OLED, and a thin film encapsulation layer TFE.

The base layer SUB may be a laminated structure including a silicon substrate, a plastic substrate, a glass substrate, an insulating film, or a plurality of insulating layers.

The circuit layer DP-CL may be located on the base layer SUB. The circuit layer DP-CL may include a plurality of insulating layers, a plurality of conductive layers, and a semiconductor layer.

The light emitting element layer DP-OLED may be located on the circuit layer DP-CL. The light emitting element layer DP-OLED may include a plurality of organic light emitting diodes.

The thin film encapsulation layer TFE may be located on the light emitting element layer DP-OLED to cover the light emitting element layer DP-OLED. The thin film encapsulation layer TFE may include a first inorganic layer, an organic layer, and a second inorganic layer, which are sequentially laminated in the third direction DR3. However, this is merely an example. The thin film encapsulation layer TFE according to some embodiments of the present disclosure is not limited thereto. For example, the thin film encapsulation layer TFE according to some embodiments of the present disclosure may further include a plurality of inorganic layers and a plurality of organic layers.

The first inorganic layer may reduce or prevent permeation of external moisture or air into the light emitting element layer DP-OLED. For example, the first inorganic layer may include a silicon nitride, a silicon oxide, or a compound having a combination thereof.

The organic layer may be located on the first inorganic layer to provide a flat surface. Flexure in a top surface of the first inorganic layer, particles present on the first inorganic layer, or the like may be covered by the organic layer. For example, the organic layer may include an organic material.

The second inorganic layer may be located on the organic layer to cover the organic layer. The second inorganic layer may block moisture and the like discharged from the organic layer, and may reduce or prevent outward permeation thereof. The second inorganic layer may include a silicon nitride, a silicon oxide, or a compound having a combination thereof.

The input sensor IS may be located on the display panel DP. The input sensor IS may have a multi-layered structure. The input sensor IS may sense an external input in a capacitive method. However, this is merely an example. A sensing method of the input sensor IS according to some embodiments of the present disclosure is not limited thereto. For example, the input sensor IS may sense the external input in an electromagnetic induction method or a pressure sensing method.

According to some embodiments of the present disclosure, the input sensor IS may be located directly on one surface of the display panel DP. For example, the input sensor IS may be integrated with the display panel DP through an on-cell method. The input sensor IS may be manufactured with the display panel DP through a continuous process.

The input sensor IS may include a base insulating layer IS-IL0, a first conductive layer IS-CL1, a first insulating layer IS-IL1, a second conductive layer IS-CL2, and a second insulating layer IS-IL2. Each of the first conductive layer IS-CL1 and the second conductive layer IS-CL2 may have a single-layered structure, or may have a multi-layered structure in which layers are laminated in the third direction DR3.

The conductive layer having the single-layered structure may include a metal layer. For example, the metal layer may include molybdenum, silver, titanium, copper, aluminum, or an alloy thereof. However, this is merely an example. The conductive layer according to some embodiments of the present disclosure is not limited thereto. For example, the conductive layer may include a transparent conductive layer. The transparent conductive layer may include transparent conductive oxides such as an indium tin oxide (ITO), an indium zinc oxide (IZO), a zinc oxide (ZnO), and an indium tin zinc oxide (ITZO). In addition, the metal layer may include a conductive polymer such as PEDOT, a metal nanowire, and graphene.

The conductive layer having the multi-layered structure may include a plurality of metal layers. For example, the metal layers may have a three-layered structure of titanium/aluminum/titanium. The conductive layer having the multi-layered structure may include at least one metal layer and at least one transparent conductive layer.

Each of the first conductive layer IS-CL1 and the second conductive layer IS-CL2 may include a plurality of patterns.

Hereinafter, the first conductive layer IS-CL1 may include first conductive patterns, and the second conductive layer IS-CL2 may include second conductive patterns. Each of the first conductive patterns and the second conductive patterns may include sensing electrodes and sensing lines.

Each of the base insulating layer IS-IL0, the first insulating layer IS-IL1, and the second insulating layer IS-IL2 may have a single-layer structure or a multi-layered structure. Each of the base insulating layer IS-IL0, the first insulating layer IS-IL1, and the second insulating layer IS-IL2 may include an inorganic material, an organic material, or a composite material.

The housing HU may be coupled to the window WP. The housing HU may be coupled to the window WP to provide an inner space (e.g., a predetermined inner space). The display module DM may be accommodated in the inner space.

The housing HU may include a material having relatively high rigidity. For example, the housing HU may include glass, plastic, or metal, or may include a plurality of frames and/or plates having a combination of glass, plastic, and metal. The housing HU may stably protect components of the display device DD, which are accommodated in the internal space, against external impacts.

Figure 3:
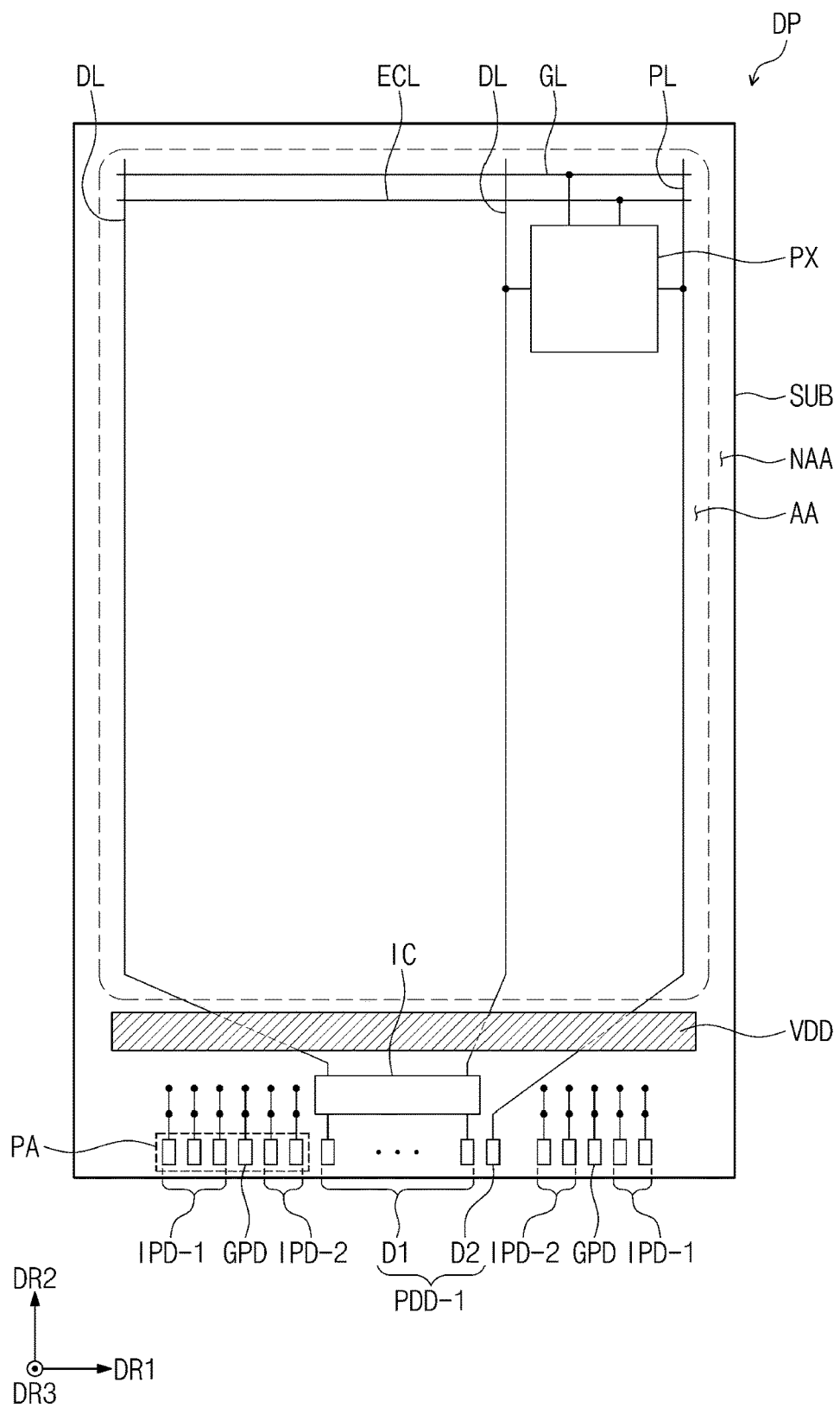
FIG. 3 is a plan view of a display panel according to some embodiments of the present disclosure.

FIG. 3 is a plan view of a display panel according to some embodiments of the present disclosure.

Referring to FIG. 3, a display panel DP may include a base layer SUB, a plurality of pixels PX, a plurality of signal lines GL, DL, PL, and ECL, a plurality of display pads PDD-1, a plurality of sensing pads IPD-1 and IPD-2, and a guard pad GPD.

In the display panel DP, an active area AA and a peripheral area NAA adjacent to the active area AA may be defined. The active area AA may be an area from which the image IM (see FIG. 1) is displayed, and the peripheral area NAA may be an area in which a driving circuit or a driving line is located. In the active area AA, the plurality of pixels PX may be located. The active area AA may correspond to the transmission area TA. The peripheral area NAA may correspond to the bezel area BZA.

The plurality of signal lines GL, DL, PL, and ECL may be located on the base layer SUB. The plurality of signal lines GL, DL, PL, and ECL may be connected to the plurality of pixels PX to transmit electrical signals to the plurality of pixels PX. Among the signal lines included in the display panel DP, a plurality of scan lines GL (hereinafter, the scan lines), a plurality of data lines DL (hereinafter, the data lines), a plurality of power lines PL (hereinafter, the power lines), and a plurality of light emitting control lines ECL (hereinafter, the light emitting control lines) are illustratively shown. However, this is merely an example. The plurality of signal lines GL, DL, PL, and ECL may further include initialization voltage lines, and is not limited to one embodiment. The plurality of signal lines GL, DL, PL, and ECL may constitute the circuit layer DP-CL (see FIG. 2).

A power pattern VDD may be located in the peripheral area NAA. The power pattern VDD may be connected to the power lines PL. The display panel DP includes the power pattern VDD, and may provide the same first power signal to the plurality of pixels PX.

Display pads PDD-1 may include a first pad D1 and a second pad D2. The first pad D1 may be provided in plurality. The plurality of first pads D1 may be connected to the data lines DL, respectively. The second pad D2 is connected to the power pattern VDD, and may be electrically connected to the power line(s) PL. The display panel DP may provide the electrical signals, which are externally provided and transmitted through the display pads PDD-1, to the plurality of pixels PX. Here, the display pads PDD-1 may further include pads for receiving other electrical signals in addition to the first pad D1 and the second pad D2, but are not limited to one embodiment.

A driving chip IC may be mounted in the peripheral area NAA. The driving chip IC may be a chip-type timing control circuit. The data lines DL may be electrically connected to the plurality of first pads D1, respectively, via the driving chip IC. However, this is merely an example. The driving chip IC according to some embodiments of the present disclosure may be mounted on a separate film from the display panel DP. In this case, the driving chip IC may be electrically connected to the display pads PDD-1 via the film.

The plurality of sensing pads IPD-1 and IPD-2 may be electrically connected to a plurality of sensing electrodes of the input sensor IS (see FIG. 2), which will be described later. Some sensing pads of the plurality of sensing pads IPD-1 and IPD-2 and other sensing pads thereof may be spaced apart from each other with the display pads PDD-1 therebetween. However, this is merely an example. An arrangement relationship between the display pads PDD-1 and the sensing pads IPD-1 and IPD-2 according to some embodiments of the present disclosure is not limited thereto, but may change variously.

Figure 4:
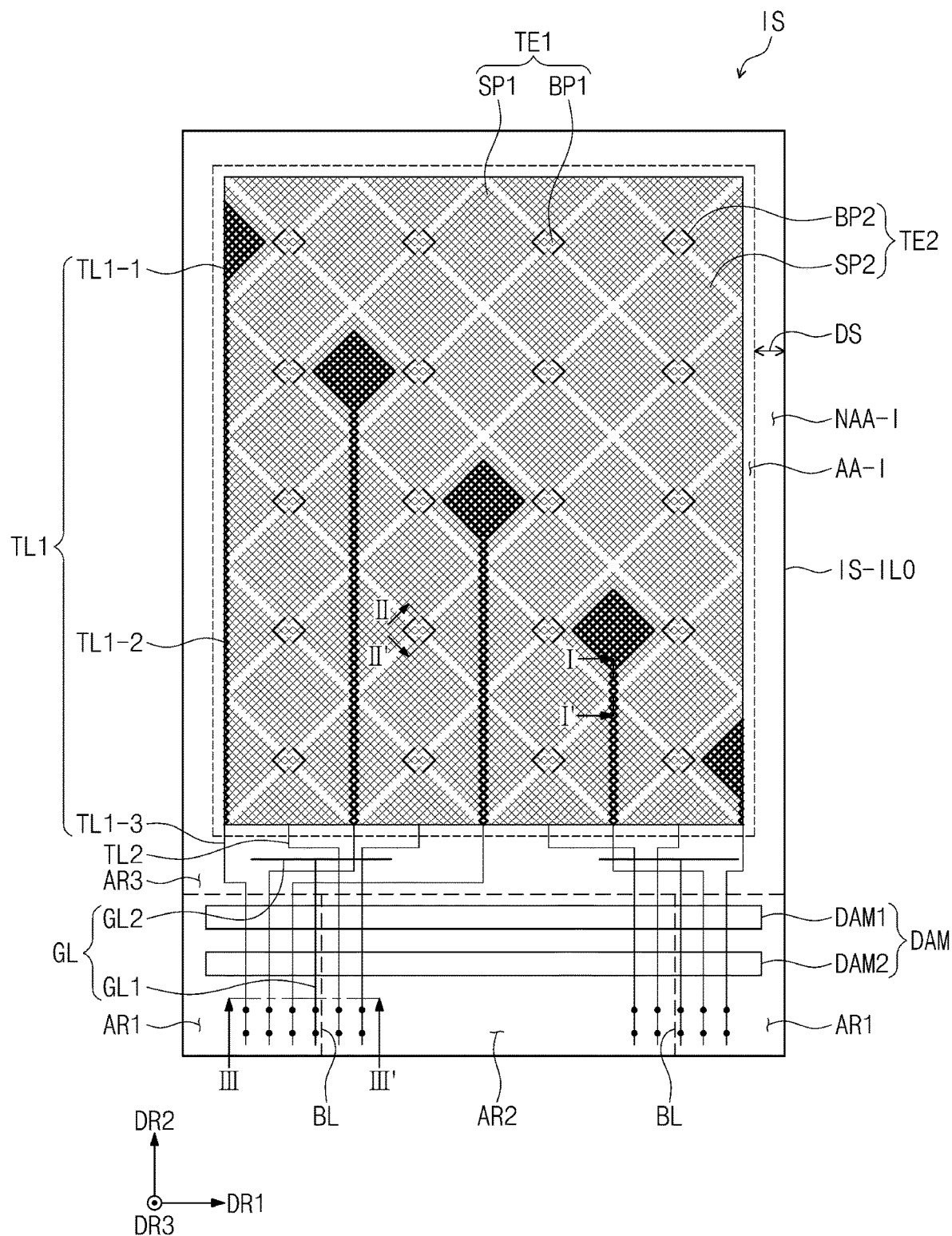
FIG. 4 is a plan view of an input sensor according to some embodiments of the present disclosure.

FIG. 4 is a plan view of an input sensor according to some embodiments of the present disclosure.

Referring to FIGS. 3 and 4, an input sensor IS may include a base insulating layer IS-IL0, a plurality of sensing electrodes TE1 and TE2, a plurality of sensing lines TL1 and TL2, and a guard electrode GL.

In the input sensor IS, an active area AA-I and a peripheral area NAA-I adjacent to the active area AA-I may be defined. The active area AA-I may be an area in which an external input is sensed, and the peripheral area NAA-I may be an area in which lines and the like are located. In the active area AA-I, the plurality of sensing electrodes TE1 and TE2 and some portions TL1-1 and TL1-2 of the plurality of sensing lines TL1 and TL2 may be located. The active area AA-I may correspond to the transmission area TA (see FIG. 1) and/or to the active area AA of the display panel DP.

The peripheral area NAA-I may correspond to the bezel area BZA (see FIG. 1) and/or to the peripheral area NAA of the display panel DP. The peripheral area NAA-I may include a first area AR1, a second area AR2, and a third area AR3. The second area AR2 may be spaced apart from the first area AR1 in a first direction DR1. The first area AR1 and the second area AR2 may face each other with a boundary BL therebetween. The first area AR1 may be provided in plurality. The plurality of first areas AR1 may be spaced apart from each other with the second area AR2 therebetween. The third area AR3 may be defined between the first area AR1 and the active area AA-I, and between the second area AR2 and the active area AA-I.

The plurality of sensing electrodes TE1 and TE2 may include a plurality of first sensing electrodes TE1 and a plurality of second sensing electrodes TE2. The plurality of first sensing electrodes TE1 and the plurality of second sensing electrodes TE2 may be located on the active area AA-I. The plurality of first sensing electrodes TE1 and the plurality of second sensing electrodes TE2 may have a mesh shape. The input sensor IS may acquire information about an external input through change in capacitance between the plurality of first sensing electrodes TE1 and the plurality of second sensing electrodes TE2.

Each of the plurality of first sensing electrodes TE1 may extend in a first direction DR1, and the first sensing electrodes TE1 may be arranged in a second direction DR2. Each of the plurality of first sensing electrodes TE1 may include a plurality of first sensing patterns SP1 and a plurality of first connection patterns BP1. The plurality of first sensing patterns SP1 may be arranged in the first direction DR1. At least one of the first connection patterns BP1 may connect two neighboring first sensing patterns SP1.

Each of the plurality of second sensing electrodes TE2 may extend in the second direction DR2, and the second sensing electrodes TE2 may be arranged in the first direction DR1. Each of the plurality of second sensing electrodes TE2 may include a plurality of second sensing patterns SP2 and a plurality of second connection patterns BP2. The plurality of second sensing patterns SP2 may be arranged in the second direction DR2. At least one of the second connection patterns BP2 may connect two neighboring second sensing patterns SP2. The plurality of second connection patterns BP2 may respectively cross the plurality of first connection patterns BP1 while being insulated from the plurality of first connection patterns BP1.

The plurality of sensing lines TL1 and TL2 may include a plurality of first sensing lines TL1 and a plurality of second sensing lines TL2.

The plurality of first sensing lines TL1 may be electrically connected to the plurality of first sensing electrodes TE1, respectively. Each of the plurality of first sensing lines TL1 may include a first line portion TL1-1, a second line portion TL1-2, and a third line portion TL1-3.

The first line portion TL1-1 and the second line portion TL1-2 may be located in the active area AA-I. In the active area AA-I, the plurality of first sensing lines TL1 and the plurality of second sensing electrodes TE2 may be alternately arranged. For example, the plurality of first line portions TL1-1 and the plurality of second sensing electrodes TE2 may be alternately arranged, one by one. The plurality of second line portions TL1-2 and the plurality of second sensing electrodes TE2 may be alternately arranged, one by one. The first line portion TL1-1 and the second line portion TL1-2 may have a mesh shape.

Each of the first line portions TL1-1 may overlap a respective one first sensing pattern SP1 of the plurality of first sensing patterns SP1. The first line portion TL1-1 may be connected to the first sensing pattern SP1. The second line portion TL1-2 may be connected to the first line portion TL1-1. The second line portion TL1-2 may extend in the second direction DR2. The third line portion TL1-3 may be located in the peripheral area NAA-I. The third line portion TL1-3 may be connected to the second line portion TL1-2. The plurality of third line portions TL1-3 may be brought together and arranged in the first area AR1. For example, the plurality of third line portions TL1-3 may be located only in the first area AR1 among the first area AR1 and the second area AR2. When viewed in a plan view, the plurality of third line portions TL1-3 might not overlap the second area AR2.

According to some embodiments of the present disclosure, some portions (e.g., first and second line portions TL1-1 and TL1-2) of each of the plurality of first sensing lines TL1 may be located in the active area AA-I. The plurality of first sensing lines TL1 extend in the active area AA-I in the second direction DR2, and thus, might not overlap the peripheral area NAA-I that is adjacent to the active area AA-I in the first direction DR1. Thus, a width DS of the peripheral area NAA-I in the first direction DR1 may be reduced. Therefore, the display device DD (see FIG. 1), in which the surface area of the bezel area BZA (see FIG. 1) is reduced, may be provided.

The second sensing lines TL2 may be electrically connected to the second sensing electrodes TE2, respectively. The plurality of second sensing lines TL2 may be located in the peripheral area NAA-I. The plurality of second sensing lines TL2 may be brought together and arranged in the second area AR2. For example, the plurality of second sensing lines TL2 may be located only in the second area AR2 among the first area AR1 and the second area AR2. When viewed in a plan view, the plurality of second sensing lines TL2 might not overlap the first area AR1. The plurality of third line portions TL1-3 and the plurality of second sensing lines TL2 may cross each other in the third area AR3 while being insulated from each other.

The guard electrode GL may be located in the peripheral area NAA-I. The guard electrode GL may be located between the plurality of first sensing lines TL1 and the plurality of second sensing lines TL2. A ground voltage may be applied to the guard electrode GL. Even though a predetermined gap might not be provided between the plurality of first sensing lines TL1 and the plurality of second sensing lines TL2, the guard electrode GL may reduce the occurrence of parasitic capacitance between the plurality of first sensing lines TL1 and the plurality of second sensing lines TL2. Thus, the guard electrode GL may improve touch sensitivity of the display device DD. The guard electrode GL may include a first guard electrode GL1 and a second guard electrode GL2.

The first guard electrode GL1 may extend in the second direction DR2 and may be located between the plurality of third line portions TL1-3 extending in the second direction DR2 and the plurality of second sensing lines TL2 extending in the second direction DR2. The first guard electrode GL1 may be located in or adjacent to the boundary BL between the first area AR1 and the second area AR2 (e.g., the first guard electrode GL1 may define the boundary BL).

The second guard electrode GL2 may be electrically connected to the first guard electrode GL1. The second guard electrode GL2 may extend in the first direction DR1, and may be located between the plurality of third line portions TL1-3 extending in the first direction DR1 and the plurality of second sensing lines TL2 extending in the first direction DR1. The second guard electrode GL2 may be located in the third area AR3. The second guard electrode GL2 may cross each of the plurality of third line portions TL1-3 and the plurality of second sensing lines TL2 while being insulated from each of the plurality of third line portions TL1-3 and the plurality of second sensing lines TL2.

The guard pad GPD may be electrically connected to the first guard electrode GL1. The guard pad GPD may apply a ground voltage to the guard electrode GL.

The plurality of sensing pads IPD-1 and IPD-2 may include a plurality of first sensing pads IPD-1 and a plurality of second sensing pads IPD-2. The first sensing pads IPD-1 may be electrically connected to the first sensing lines TL1, respectively. The second sensing pads IPD-2 may be electrically connected to the second sensing lines TL2, respectively.

The sensing lines TL1 and TL2 and the guard electrode GL may be electrically connected to the sensing pads IPD-1 and IPD-2 and the guard pad GPD, respectively, via contact holes. Respective ones of the first sensing pads IPD-1 and the second sensing pads IPD-2 may be spaced apart from each other with a guard pad GPD therebetween.

In a case in which, unlike the some embodiments of the present disclosure, the plurality of first sensing lines TL1 and the plurality of second sensing lines TL2 do not cross each other in the third area AR3 while being insulated from each other, the plurality of first sensing lines TL1 and the plurality of second sensing lines TL2 are alternately arranged one by one, and the guard electrode GL may be located between one first sensing line TL1 and one second sensing line TL2 that are adjacent to each other. In this specification, being adjacent to each other means that neither another first sensing line TL1 nor another second sensing line TL2 is located between the first sensing line TL1 and the second sensing line TL2. In this case, the guard electrode GL is provided in plurality, and each guard electrode GL may be located in a respective one of spaces between the first sensing lines and the second sensing lines. However, according to some embodiments of the present disclosure, the plurality of first sensing lines TL1 and the plurality of second sensing lines TL2, which are alternately arranged one by one in the boundary between the active area AA-I and the third area AR3, cross each other in the third area AR3 while being insulated from each other. Thus, the plurality of first sensing lines TL1 may be brought together and arranged in the first area AR1, and the plurality of second sensing lines TL2 may be brought together and arranged in the second area AR2. Therefore, a number of the first sensing lines TL1 and the second sensing lines TL2 that are adjacent to each other may be reduced. The guard electrode GL may be located between the first sensing line TL1 and the second sensing line TL2 adjacent to each other, and thus the number of guard electrodes GL may be reduced. Thus, the number of guard pads GPD located between the plurality of first sensing pads IPD-1 and the plurality of second sensing pads IPD-2 may be reduced, and thus, a sensing pad area PA may be reduced. Therefore, the display device DD, in which the surface area of the bezel area BZA is reduced, may be provided.

The display module DM may further include a protruding member DAM in the peripheral area NAA-I. The protruding member DAM may include a first protruding member DAM1 adjacent to the active area AA-I and a second protruding member DAM2 adjacent to the first protruding member DAM1. The protruding member DAM may prevent organic monomer, which is used while applying the organic layer of the thin film encapsulation layer TFE, from flowing outward. When viewed in a plan view, the protruding member DAM may overlap the power pattern VDD.

Figure 5:
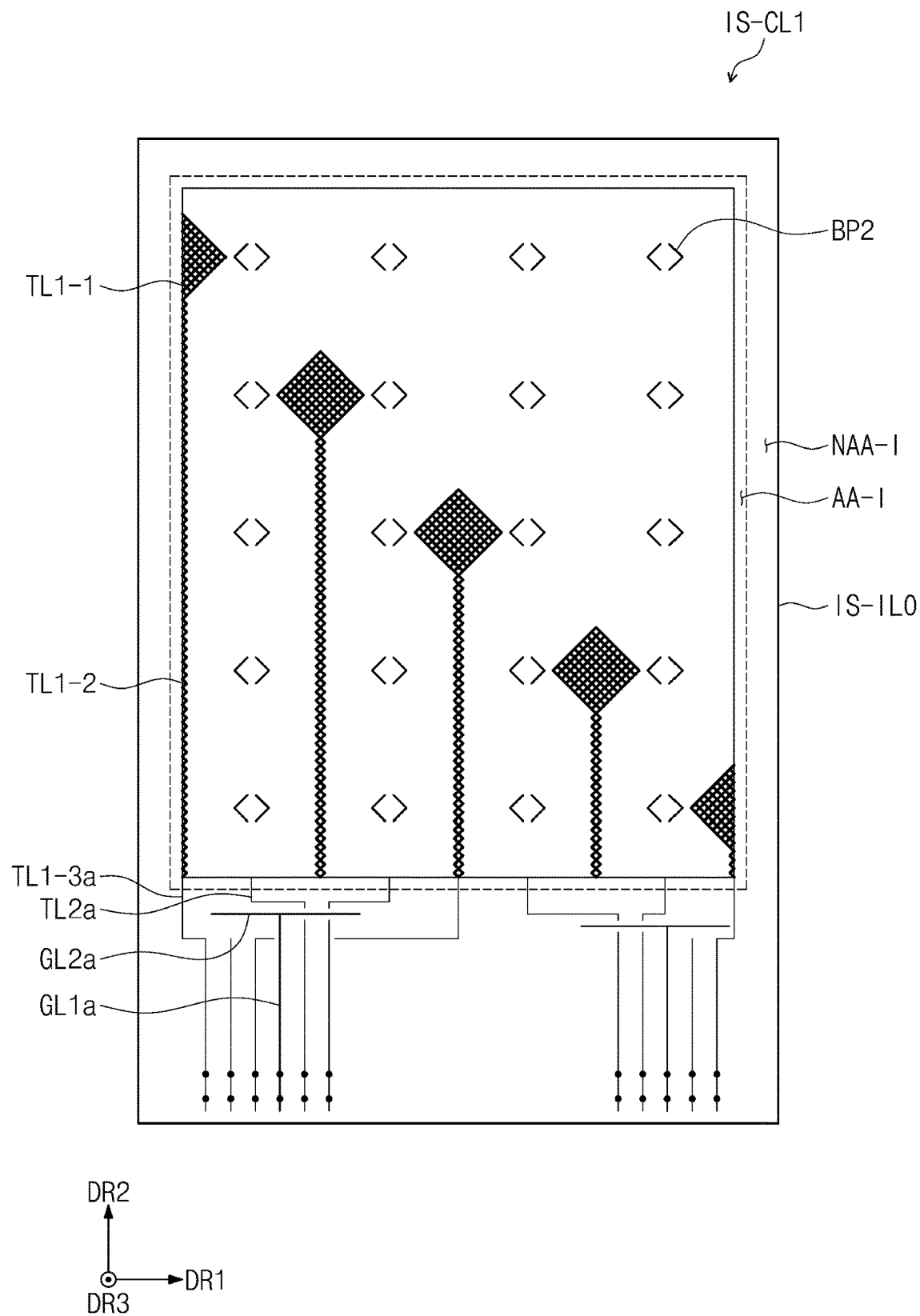
FIG. 5 is a plan view illustrating a first conductive layer according to some embodiments of the present disclosure.
Figure 6:
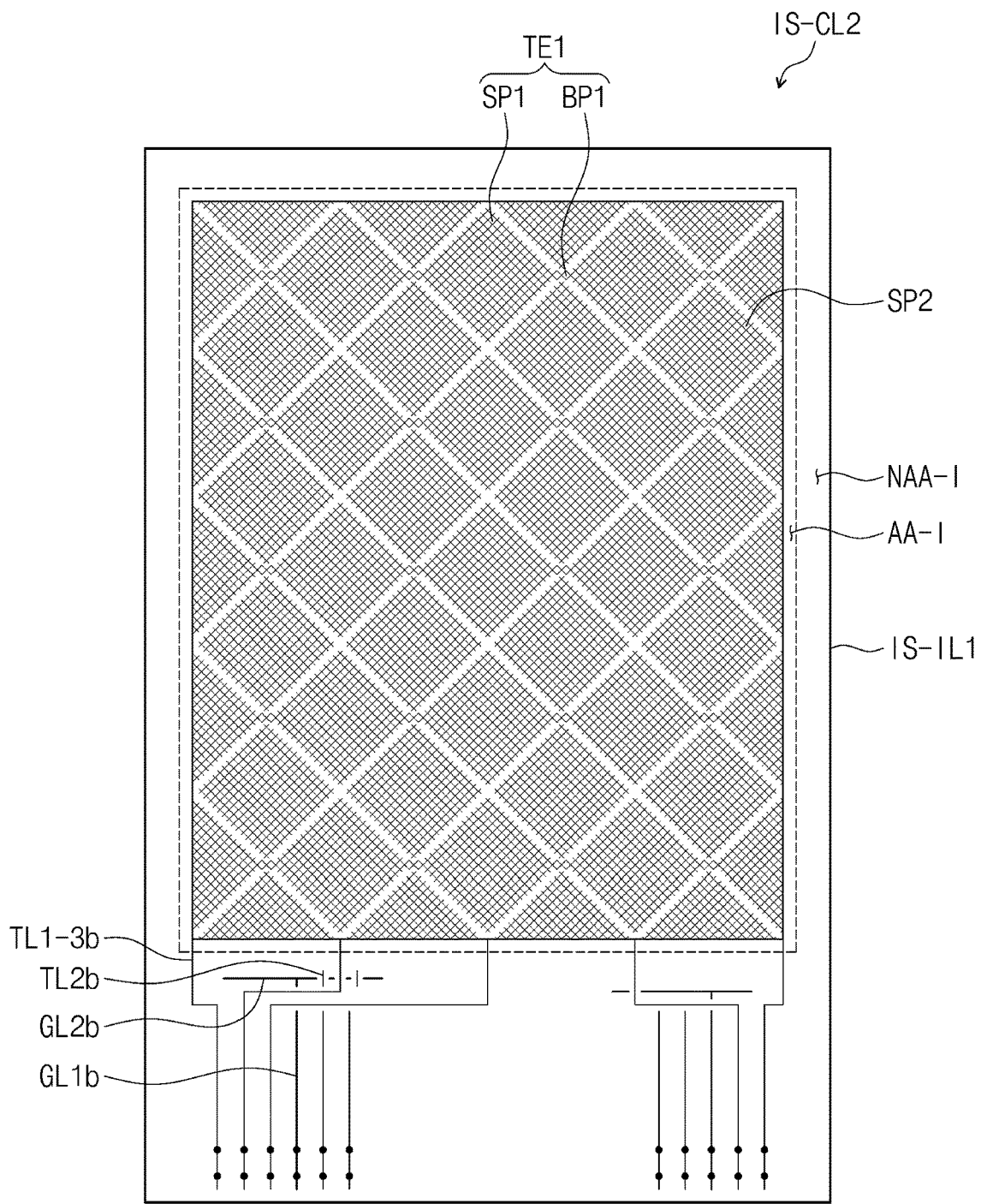
FIG. 6 is a plan view illustrating a second conductive layer according to some embodiments of the present disclosure.

FIG. 5 is a plan view illustrating a first conductive layer according to some embodiments of the present disclosure, and FIG. 6 is a plan view illustrating a second conductive layer according to some embodiments of the present disclosure. In describing FIGS. 5 and 6, the same reference symbols are given to the components described through FIGS. 2 and 4, and duplicated descriptions thereof will be omitted.

Referring to FIGS. 4 to 6, each of the plurality of third line portions TL1-3, the plurality of second sensing lines TL2, and the guard electrode GL may be located on at least one layer.

Each of the third line portions TL1-3 may include a first lower line TL1-3a and a first upper line TL1-3b located above the first lower line TL1-3a. Each of the plurality of second sensing lines TL2 may include a second lower line TL2a and a second upper line TL2b located above the second lower line TL2a. The first guard electrode GL1 may include a first guard lower line GL1a and a first guard upper line GL1b located above the first guard lower line GL1a. The second guard electrode GL2 may include a second guard lower line GL2a and a second guard upper line GL2b located above the second guard lower line GL2a.

As shown in FIG. 5, the first conductive layer IS-CL1 may be located on the base insulating layer IS-IL0. The first conductive layer IS-CL1 may include the plurality of second connection patterns BP2, the plurality of first line portions TL1-1, the plurality of second line portions TL1-2, the plurality of first lower lines TL1-3a, the plurality of second lower lines TL2a, the first guard lower line GL1a, and the second guard lower line GL2a.

The plurality of first line portions TL1-1 and the plurality of second line portions TL1-2 may be located on the same layer as the plurality of second connection patterns BP2.

In the active area AA-I, the plurality of second line portions TL1-2 may be spaced apart from each other in the first direction DR1.

As shown in FIG. 6, the second conductive layer IS-CL2 may be located on the first insulating layer IS-IL1. The first conductive layer IS-CL2 may include the plurality of first sensing electrodes TE1, the plurality of second sensing patterns SP2, the plurality of first upper lines TL1-3b, the plurality of second upper lines TL2b, the first guard upper line GL1b, and the second guard upper line GL2b.

The plurality of first line portions TL1-1 may respectively overlap the corresponding sensing patterns of the plurality of the first sensing patterns SP1.

When viewed in a plan view, at least portions of the first lower line TL1-3a and the first upper line TL1-3b may overlap each other. The first lower line TL1-3a and the first upper line TL1-3b may be electrically connected to each other.

When viewed in a plan view, at least portions of the second lower TL2a and the second upper line TL2b may overlap each other. The second lower line TL2a may be electrically connected to the second upper line TL2b.

When viewed in a plan view, at least portions of the first guard lower line GL1a and the first guard upper line GL1b may overlap each other. The first guard lower line GL1a and the first guard upper line GL1b may be electrically connected to each other.

When viewed in a plan view, at least portions of the second guard lower line GL2a and the second guard upper line GL2b may overlap each other. The second guard lower line GL2a may be electrically connected to the second guard upper line GL2b.

In a region of the third area AR3 in which the plurality of third line portions TL1-3, the plurality of second sensing lines TL2, and the guard electrode GL cross each other, each of the plurality of third line portions TL1-3, the plurality of second sensing lines TL2, and the guard electrode GL may be located on one layer.

For example, in a region of the third area AR3 in which the plurality of third line portions TL1-3 and the guard electrode GL cross each other, the first guard lower line GL1a and the second guard lower line GL2a may be located above the base insulating layer IS-IL0, while the first upper line TL1-3b may be located above the first guard lower line GL1a and the second guard lower line GL2a.

In a region of the third area AR3 in which the plurality of second sensing lines TL2 and the guard electrode GL cross each other, the first guard lower line GL1a and the second guard lower line GL2a may be located above the base insulating layer IS-IL0, while the second upper line TL2b may be located above the first guard lower line GL1a and the second guard lower line GL2a.

In a region of the third area AR3 in which the plurality of third line portions TL1-3 and the plurality of second sensing lines TL2 cross each other, the second lower line TL2a may be located above the base insulating layer IS-IL0, while the first upper line TL1-3b may be located above the second lower line TL2a.

However, this is merely an example. In the region of the third area AR3 according to some embodiments of the present disclosure in which the plurality of third line portions TL1-3, the plurality of second sensing lines TL2, and the guard electrode GL cross each other, a vertical arrangement relationship between the plurality of third line portions TL1-3, the plurality of second sensing lines TL2, and the guard electrode GL is not limited to the arrangement described above.

In a region of the third area AR3, in which the plurality of third line portions TL1-3, the plurality of second sensing lines TL2, and the guard electrode GL do not cross each other, the first area AR1, and the second area AR2, each of the plurality of third line portions TL1-3, the plurality of second sensing lines TL2, and the guard electrode GL may be located on two layers.

According to some embodiments of the present disclosure, in the region of the third area AR3, in which the plurality of third line portions TL1-3, the plurality of second sensing lines TL2, and the guard electrode GL do not cross each other, the size of the first area AR1, the size of the second area AR2, and the overall resistance of the plurality of third line portions TL1-3 and the plurality of second sensing lines TL2, may be reduced. RC delays of the plurality of third line portions TL1-3 and the plurality of second sensing lines TL2 may be reduced. Delays of signals of the plurality of third line portions TL1-3 and the plurality of second sensing lines TL2 may be reduced or prevented, and thus the signals may be transmitted at high speed. Thus, the display device DD having improved touch sensitivity may be provided.

Figure 7:
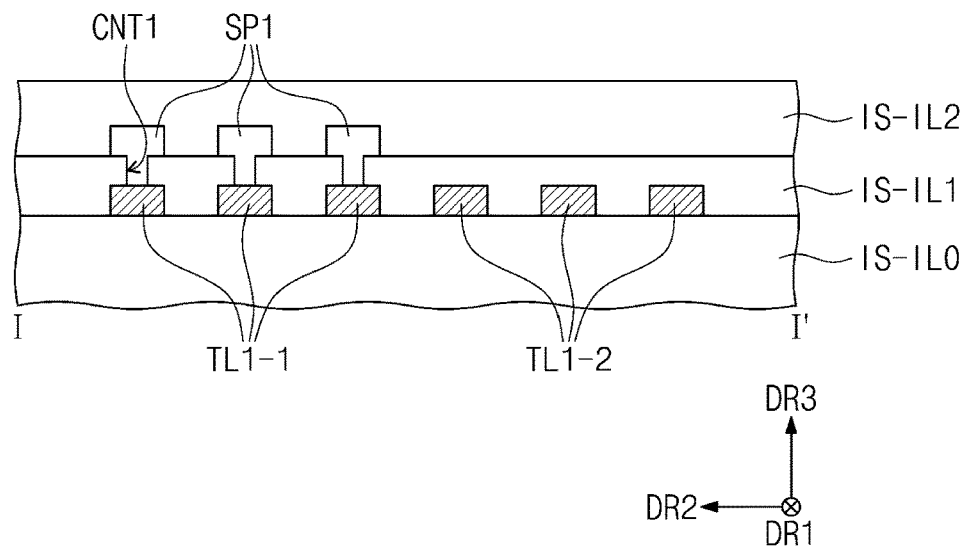
FIG. 7 is a cross-sectional view taken along the line I-I' of FIG. 4 according to some embodiments of the present disclosure.

FIG. 7 is a cross-sectional view taken along the line I-I' of FIG. 4 according to some embodiments of the present disclosure. In describing FIG. 7, the same reference symbols are given to the components described through FIG. 4, and duplicated descriptions thereof will be omitted.

Referring to FIGS. 4 and 7, a plurality of first contact holes CNT1 may be formed by penetrating the first insulating layer IS-IL1 in the third direction DR3.

The first line portion TL1-1 may be electrically connected to the plurality of first sensing patterns SP1 through the plurality of first contact holes CNT1.

According to some embodiments of the present disclosure, the plurality of first sensing lines TL1 may be electrically connected to the plurality of first sensing patterns SP1, respectively, in the active area AA-I. In the active area AA-I, each of the plurality of first sensing lines TL1 may extend in the second direction DR2. When viewed in a plan view, the plurality of first line portions TL1-1 and the plurality of second line portions TL1-2 might not overlap an area of the peripheral area NAA-I that is adjacent to the active area AA-I in the first direction DR1. Accordingly, the surface area of the peripheral area NAA-I may be reduced, and the display device DD, in which the surface area of the bezel area BZA is reduced, may be provided.

Figure 8:
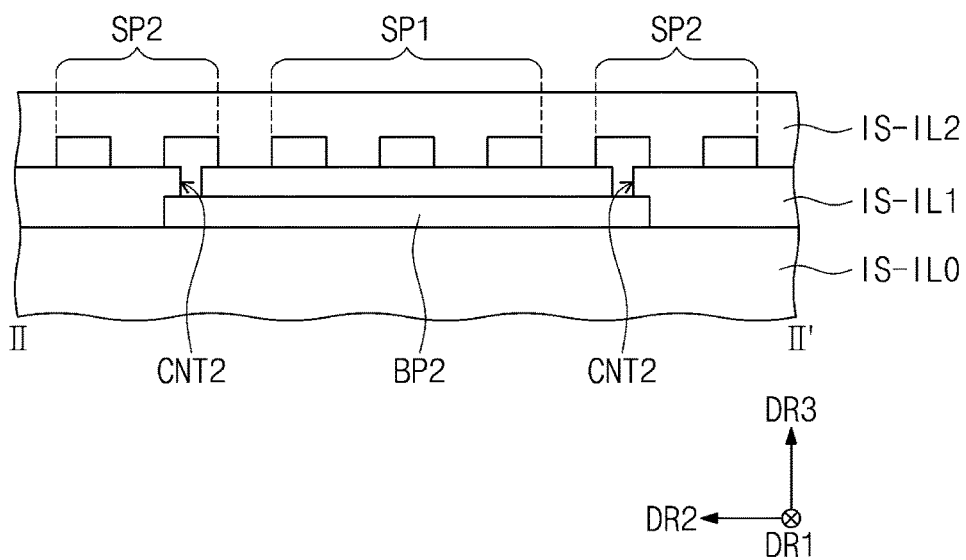
FIG. 8 is a cross-sectional view taken along the line II-II' of FIG. 4 according to some embodiments of the present disclosure.

FIG. 8 is a cross-sectional view taken along the line II-II' of FIG. 4 according to some embodiments of the present disclosure. In describing FIG. 8, the same reference symbols are given to the components described through FIG. 4, and duplicated descriptions thereof will be omitted.

Referring to FIGS. 4 and 8, a plurality of second contact holes CNT2 may be formed by penetrating the first insulating layer IS-IL1 in the third direction DR3.

The two neighboring second sensing patterns SP2 of the plurality of second sensing patterns SP2 may be connected to the second connection patterns BP2 through the second contact holes CNT2, respectively.

Figure 9:
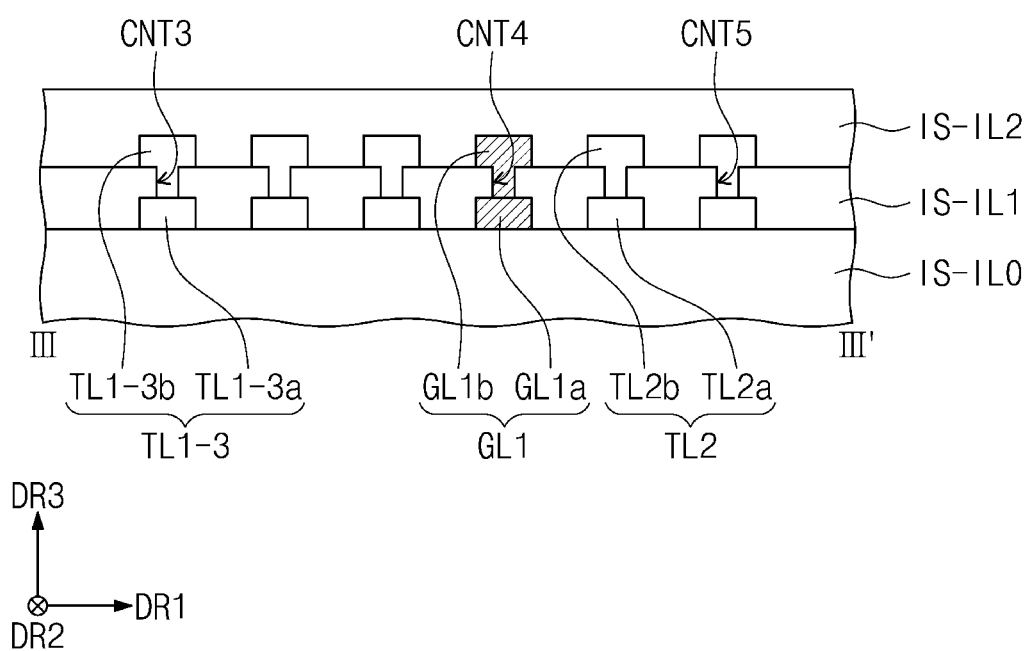
FIG. 9 is a cross-sectional view taken along the line III-III' of FIG. 4 according to some embodiments of the present disclosure.

FIG. 9 is a cross-sectional view taken along the line III-III' of FIG. 4 according to some embodiments of the present disclosure. In describing FIG. 9, the same reference symbols are given to the components described through FIGS. 4 to 6, and duplicated descriptions thereof will be omitted.

Referring to FIGS. 4, 5, 6, and 9, each of the plurality of third line portions TL1-3, the plurality of second sensing lines TL2, and the guard electrode GL may be located on two layers in the first area AR1 and the second area AR2.

A plurality of third contact holes CNT3 may be formed by penetrating the first insulating layer IS-IL1 in the third direction DR3. The first lower lines TL1-3a and the first upper lines TL1-3b may be electrically connected to each other, respectively, through the third contact holes CNT3.

A fourth contact hole CNT4 may be formed by penetrating the first insulating layer IS-IL1 in the third direction DR3. The first guard lower line GL1a and the first guard upper line GL1b may be electrically connected to each other through the fourth contact hole CNT4.

A plurality of fifth contact holes CNT5 may be formed by penetrating the first insulating layer IS-IL1 in the third direction DR3. The second lower lines TL2a and the second upper lines TL2b may be electrically connected to each other, respectively, through the fifth contact holes CNT5.

According to some embodiments of the present disclosure, in the first area AR1 and the second area AR2, each of the plurality of third line portions TL1-3, the plurality of second sensing lines TL2, and the first guard electrode GL1 may be located on two layers, and may be respectively formed through the contact holes. Thus, the overall resistance of each of the plurality of third line portions TL1-3, the plurality of second sensing lines TL2, and the first guard electrode GL1 may be reduced. The RC delays of the plurality of third line portions TL1-3 and the plurality of second sensing lines TL2 may be reduced. The delays of the signals of the plurality of third line portions TL1-3 and the plurality of second sensing lines TL2 may be reduced or prevented, and thus the signals may be transmitted at high speed. Thus, the display device DD having improved touch sensitivity may be provided.

Figure 10:
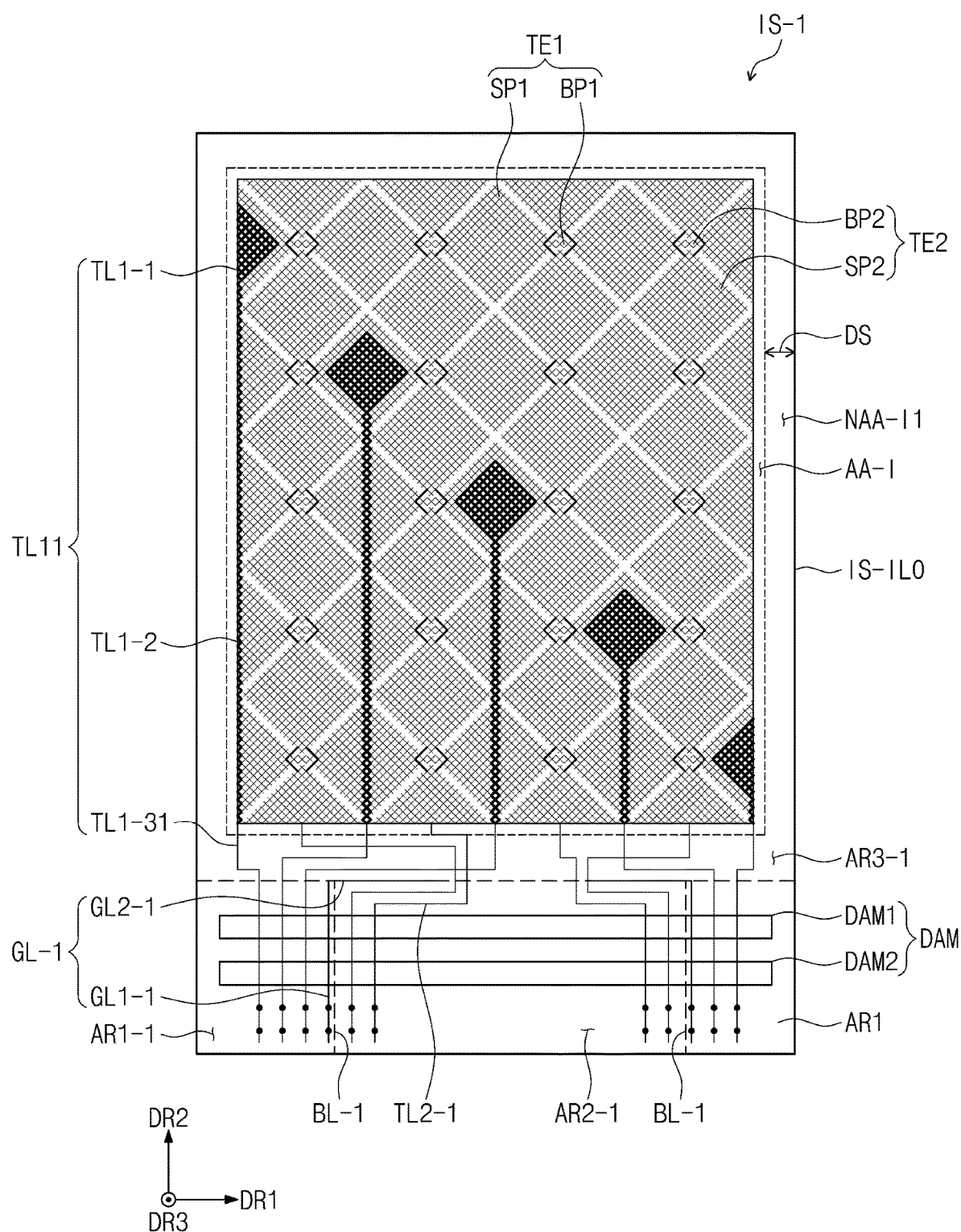
FIG. 10 is a plan view of an input sensor according to some embodiments of the present disclosure.

FIG. 10 is a plan view of an input sensor according to some embodiments of the present disclosure. In describing FIG. 10, the same reference symbols are given to the components described through FIG. 4, and duplicated descriptions thereof will be omitted.

Referring to FIG. 10, a peripheral area NAA-I1 may correspond to the bezel area BZA (see FIG. 1) and the peripheral area NAA (see FIG. 3) of the display panel DP. The peripheral area NAA-I1 may include a first area AR1-1, a second area AR2-1, and a third area AR3-1. The second area AR2-1 may be spaced apart from the first area AR1-1 in the first direction DR1. The first area AR1-1 may be provided in plurality. The plurality of first areas AR1-1 may be spaced apart from each other with the second area AR2-1 therebetween. The third area AR3-1 may be defined between the first area AR1-1 and an active area AA-I, and between the second area AR2-1 and the active area AA-I.

A plurality of first sensing lines TL11 may be electrically connected to a plurality of first sensing electrodes TE1, respectively. Each of the plurality of first sensing lines TL11 may include a first line portion TL1-1, a second line portion TL1-2, and a third line portion TL1-31.

The third line portion TL1-31 may be located in the peripheral area NAA-I1. The third line portion TL1-31 may be connected to the second line portion TL1-2. The plurality of third line portions TL1-3 may be brought together and arranged in the first area AR1-1. When viewed in a plan view, the plurality of third line portions TL1-31 might not overlap the second area AR2-1.

The plurality of third line portions TL1-31 and the plurality of second sensing lines TL2-1 may cross each other in the third area AR3-1 while being insulated from each other.

A guard electrode GL-1 may be located in the peripheral area NAA-I1. The guard electrode GL-1 may be located between the plurality of first sensing lines TL11 and the plurality of second sensing lines TL2-1. A ground voltage may be applied to the guard electrode GL-1. The guard electrode GL-1 may include a first guard electrode GL1-1 and a second guard electrode GL2-1.

The first guard electrode GL1-1 may extend in a second direction DR2 and may be located between the plurality of third line portions TL1-31 extending in the second direction DR2 and the plurality of second sensing lines TL2-1 extending in the second direction DR2. The first guard electrode GL1-1 may be located in, next to, or may define, a boundary between the first area AR1-1 and the second area AR2-1.

The second guard electrode GL2-1 may be electrically connected to the first guard electrode GL1-1. The second guard electrode GL2-1 may extend in the first direction DR1 and may be located between the plurality of third line portions TL1-31 extending in the first direction DR1 and the plurality of second sensing lines TL2-1 extending in the first direction DR1. The second guard electrode GL2-1 may be located in, next to, or may define, a boundary between the second area AR2-1 and the third area AR3-1. The second guard electrode GL2-1 may be spaced apart from the plurality of third line portions TL1-31 and the plurality of second sensing lines TL2-1.

According to some embodiments of the present disclosure, the plurality of first sensing lines TL11 and the plurality of second sensing lines TL2-1, which are alternately arranged one by one in or near the boundary between the active area AA-I and the third area AR3-1, cross each other in the third area AR3-1 while being insulated from each other. Thus, the plurality of first sensing lines TL11 may be brought together and arranged in the first area AR1-1, and the plurality of second sensing lines TL2-1 may be brought together and arranged in the second area AR2-1. The guard electrode GL-1 may be located between the plurality of first sensing lines TL11 and the plurality of second sensing lines TL2-1. Thus, the one guard electrode GL-1, which is located in a boundary BL-1 between the first area AR1-1 and the second area AR2-1, may reduce the occurrence of parasitic capacitance between the plurality of first sensing lines TL11 and the plurality of second sensing lines TL2-1. Therefore, the display device DD (see FIG. 1) having improved touch sensitivity may be provided. Also, the number of guard electrodes GL-1 is reduced, and thus, the display device DD (see FIG. 1), in which the surface area of the bezel area BZA (see FIG. 1) is reduced, may be provided.

As described above, the plurality of first sensing lines and the plurality of second sensing lines, which are alternately located one by one in or near the boundary between the active area and the peripheral area, may cross each other in the peripheral area while being insulated from each other. The plurality of first sensing lines may be located in the first area of the peripheral area, and the plurality of second sensing lines may be located in the second area of the peripheral area. The guard electrode is located between the first sensing line and the second sensing line, which are adjacent to each other, and may reduce the occurrence of parasitic capacitance between the first sensing line and the second sensing line.

Also, the plurality of first sensing lines are brought together and arranged in the first area, and the plurality of second sensing lines are brought together and arranged in the second area. Thus, the number of guard electrodes located between the first sensing lines and the second sensing lines adjacent to each other may be reduced. Because the number of guard electrodes is reduced, the display device having the reduced surface area of the bezel area may be provided.

Although described with reference to some embodiments of the present disclosure, it will be understood that various changes and modifications of the present disclosure may be made by one ordinary skilled in the art or one having ordinary knowledge in the art without departing from the spirit and technical field of the present disclosure as hereinafter claimed. Hence, the technical scope of the present disclosure is not limited to the detailed descriptions in the specification but should be determined only with reference to the claims, with functional equivalents thereof to be included therein.

What is claimed is:

1. A display device comprising:
   a display panel; and
   an input sensor on the display panel, and in which an active area and a peripheral area, which is adjacent to the active area and comprises a first area and a second area spaced apart in a first direction, are defined, the input sensor comprising:
      first sensing electrodes extending in the first direction, and arranged in a second direction crossing the first direction;
      second sensing electrodes extending in the second direction, and arranged in the first direction;
      first sensing lines extending in the second direction within the active area, connected to the first sensing electrodes, and partially located in the first area, respectively, at least one of the first sensing lines crossing at least one row of corresponding ones of the second sensing electrodes;
      second sensing lines electrically connected to the second sensing electrodes, respectively, and at least partially located in the second area; and
      a first guard electrode between the first sensing lines and the second sensing lines, and at a boundary between the first area and the second area.

2. The display device of claim 1, wherein the first sensing lines are spaced apart in the first direction within the active area.

3. The display device of claim 1, wherein the first sensing electrodes comprise first sensing patterns arranged in the first direction and first connection patterns connecting neighboring ones of the first sensing patterns,
   wherein the second sensing electrodes comprise second sensing patterns arranged in the second direction and second connection patterns connecting neighboring ones of the second sensing patterns, and
   wherein the first connection patterns and the second connection patterns respectively cross each other while being insulated from each other.

4. The display device of claim 3, wherein the first sensing lines in the active area are on a same layer as the second connection patterns.

5. The display device of claim 3, wherein, when viewed in a plan view, the first sensing lines and the second sensing electrodes are alternately arranged.

6. The display device of claim 1, wherein the first guard electrode is configured to apply a ground voltage.

7. The display device of claim 1, further comprising:
a guard pad overlapping the peripheral area, and electrically connected to the first guard electrode; and
sensing pads overlapping the peripheral area, and electrically connected to the first sensing lines and the second sensing lines, respectively.

8. The display device of claim 7, wherein the sensing pads comprise:
first sensing pads electrically connected to the first sensing lines, respectively; and
second sensing pads electrically connected to the second sensing lines, respectively,
wherein the first sensing pads and the second sensing pads are spaced apart from each other with the guard pad therebetween.

9. A display device comprising:
a display panel; and
an input sensor on the display panel, and in which an active area and a peripheral area, which is adjacent to the active area and comprises a first area and a second area spaced apart in a first direction, are defined, the input sensor comprising:
first sensing electrodes extending in the first direction, and arranged in a second direction crossing the first direction;
second sensing electrodes extending in the second direction, and arranged in the first direction;
first sensing lines extending in the second direction within the active area, connected to the first sensing electrodes, and partially located in the first area, respectively;
second sensing lines electrically connected to the second sensing electrodes, respectively, and at least partially located in the second area; and
a first guard electrode between the first sensing lines and the second sensing lines, and at a boundary between the first area and the second area,
wherein the peripheral area further comprises a third area between the first area and the active area, and between the second area and the active area, and
wherein the first sensing lines and the second sensing lines cross each other in the third area.

10. The display device of claim 9, further comprising a second guard electrode in the third area, and crossing the first sensing lines and the second sensing lines.

11. The display device of claim 9, further comprising a second guard electrode at a boundary between the second area and the third area, and spaced apart from the first sensing lines and the second sensing lines.

12. A display device comprising a display panel and an input sensor on the display panel,
wherein the input sensor comprises:
a base insulating layer comprising an active area, a first area spaced apart from the active area in a second direction, and a second area spaced apart from the active area in the second direction and spaced apart from the first area in a first direction crossing the second direction;
first sensing electrodes located in the active area;
second sensing electrodes located in the active area;
first sensing lines partially located in the first area, and alternately arranged with the second sensing electrodes in the active area, at least one of the first sensing lines crossing at least one row of corresponding ones of the second sensing electrodes;
second sensing lines located in the second area and connected to the second sensing electrodes, respectively; and
a first guard electrode located between the first area and the second area.

13. The display device of claim 12, wherein the first sensing lines extend in the second direction and are spaced part from each other in the first direction.

14. The display device of claim 12, wherein the base insulating layer further comprises a third area between the active area and the first area and between the active area and the second area, and
wherein the first sensing lines and the second sensing lines cross each other in the third area while being insulated from each other.

15. The display device of claim 14, wherein the first guard electrode extends in the second direction, and
wherein the display device further comprises a second guard electrode electrically connected to the first guard electrode, and extending in the first direction.

16. The display device of claim 15, wherein the second guard electrode is in the third area and crosses the first sensing lines and the second sensing lines while being insulated from the first sensing lines and the second sensing lines.

17. The display device of claim 15, wherein the second guard electrode is at a boundary between the second area and the third area, and is spaced apart from the first sensing lines and the second sensing lines.

18. The display device of claim 12, further comprising:
a guard pad electrically connected to the first guard electrode; and
sensing pads electrically connected to the first sensing lines and the second sensing lines, respectively.

19. The display device of claim 18, wherein the guard pad is configured to supply a ground voltage to the first guard electrode.

20. The display device of claim 18, wherein the sensing pads comprise:
first sensing pads electrically connected to the first sensing lines, respectively; and
second sensing pads electrically connected to the second sensing lines, respectively,
wherein the first sensing pads and the second sensing pads are spaced apart from each other with the guard pad therebetween.

* * * * *